(12) United States Patent
Teterud

(10) Patent No.: US 6,226,141 B1
(45) Date of Patent: May 1, 2001

(54) DAMP CIRCUIT FOR A HARD DISK DRIVE WRITE HEAD

(75) Inventor: Patrick M. Teterud, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/932,449

(22) Filed: Sep. 19, 1997

(51) Int. Cl.$^7$ ................................ G11B 5/02; G11B 5/09
(52) U.S. Cl. .................................................. 360/68; 360/46
(58) Field of Search .......................................... 360/46, 68

(56) References Cited

U.S. PATENT DOCUMENTS

| | | | |
|---|---|---|---|
| 5,430,584 | 7/1995 | Petersen | 360/78.04 |
| 5,517,146 | * 5/1996 | Yamasaki | 360/46 |
| 5,619,386 | 4/1997 | Voorman et al. | 360/67 |
| 5,638,012 | 6/1997 | Hashimoto et al. | 327/110 |
| 5,939,940 | * 8/1999 | Patti | 360/46 |

* cited by examiner

Primary Examiner—Nabil Hindi
Assistant Examiner—Regina Y. Neal
(74) Attorney, Agent, or Firm—Bret J. Petersen; Frederick J. Telecky, Jr.

(57) ABSTRACT

An improved write drive circuit which reduces the ringing and overshoot transients of an H-bridge drive circuit for a hard disk drive. The invention uses a damp circuit which minimizes the amount of capacitance on the outputs of the write driver while still accomplishing the dampening of the transient ring. In a preferred embodiment, the damp circuit is a ring clamp circuit which includes a resistor connected to each node of the write head. Each resistor is then connected to the emitter of a npn transistor where the transistors have a commonly enabled gate and a common collector connected to a source voltage.

21 Claims, 2 Drawing Sheets

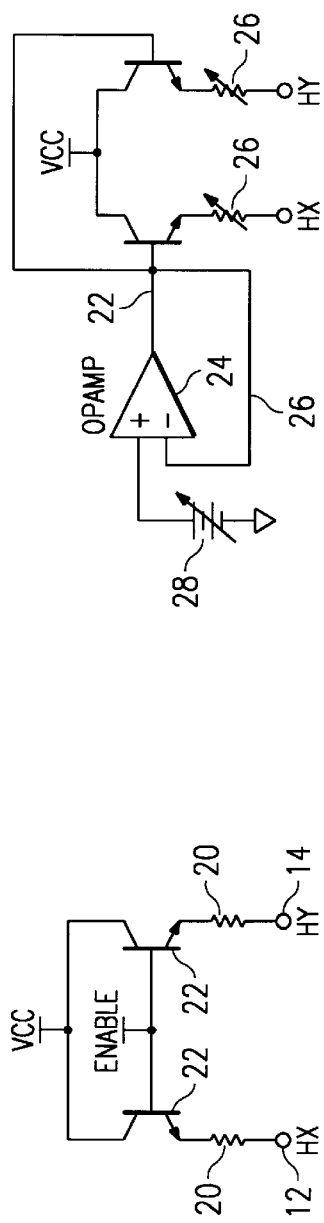
FIG. 4
FIG. 5
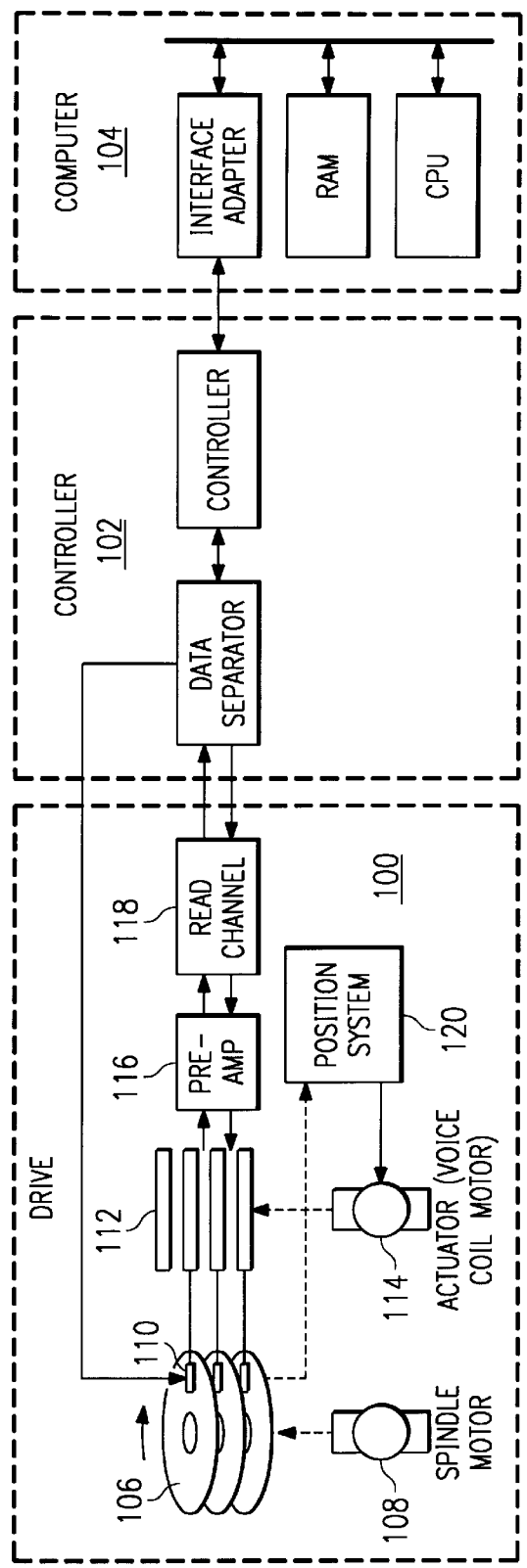
FIG. 6

DAMP CIRCUIT FOR A HARD DISK DRIVE WRITE HEAD

FIELD OF THE INVENTION

The present invention relates to the write driver circuit for a hard disk drive HDD). More particularly, it relates to a damp circuits for minimizing ringing and overshoot while not affecting the tr/tf at the write head when reversing the current through the write head.

BACKGROUND OF THE INVENTION

A hard disk drive storage system typically includes one or more rotating disks, or platters having magnitizible material coated on their surfaces. Read/write heads associated with each platter surface move together radially across the head to reach addressable data regions located on concentric circles called tracks. It is now common to have separate read and write heads. The write head is essentially a small coil of wire which stores data by magnetizing small regions of the disk platter along the tracks. A current driven through the write head creates a temporary magnetic field which magnetizes a small region of the disk at the current position of the write head.

The electronic circuitry used to drive current through the write head typically uses an H-bridge as shown in FIG. 1. For example, U.S. Pat. No. 5,638,012, issued to Hashimoto et al. and incorporated herein by reference, uses an H-bridge for a write driver circuit. The purpose of the H-bridge is to allow electric current to be driven through the write head in either direction. When the current is driven in one direction a magnetic field is created with the north pole in one direction, and when the current is driven in the opposite direction, a magnetic field is created with the north pole in the opposite direction. The H-bridge operates to switch the drive current through the head by turning on a pair of transistors to allow current to flow in a path from a supply source to ground. For example, current flows through the write head from Hx to Hy when transistors Y are turned on and transistors $\overline{Y}$ are turned off. Similarly, current flows the opposite direction when transistors $\overline{Y}$ are turned on and transistors Y are turned off. The tr, tf (rise time, fall time) is the time corresponding to the speed at which current can reverse through the inductive load of the HDD write head.

It is desirable to increase the speed of the change of current flow to increase the amount of data that can be stored on a single track of the HDD platter. In order to enhance the preamps write driver performance, the rise time (tr) and fall time (tf) of the write current must decrease without compromising the accuracy of or increasing the transient ringing in the circuit, since increasing the transient ring period on the write current decreases the maximum areal data density. FIG. 2 illustrates the current waveform for a test input to a typical prior HDD write head.

A prior art circuit for reducing the transient ringing is shown in FIG. 3. This circuit was combined with the circuit shown in FIG. 1. The Hx and Hy nodes are connected to the write head in FIG. 1. In this circuit, during transient rings current is dumped to the write head nodes through Zenner diodes. This circuit was somewhat successful in reducing the transients described above but it increased the capacitance at the write head nodes thereby increasing tr and tf.

SUMMARY OF THE INVENTION

The present invention provides an improved write drive circuit which reduces the ringing and overshoot transients of an H-bridge drive circuit. The invention uses on or more damp circuits which minimizes the amount of capacitance on the outputs of the write driver while still accomplishing the dampening of the transient ring and overshoot. In an embodiment of the present invention, a ring clamp circuit includes a resistor connected to each node of the write head. Each resistor is then connected to the emitter of a npn transistor where the transistors have an enabling gate and a collector connected to a source voltage. The enabling gates may be common and the collector sources may be tied to a common source voltage.

In another embodiment of the present invention, an overshoot damp circuit also includes a resistor connected to each node of the write head. Each resistor is then connected to the emitter of a npn transistor where the transistors have an enabling gate and a collector connected to a source voltage. In the overshoot damp circuit, the resistors, if used, are smaller and the bias voltage of the transistors is chosen to limit the overshoot. Thus essentially the same circuit architecture of the previous embodiment may be optimized to specifically target the ringing or overshoot. In a preferred embodiment, a ring clamp and overshoot circuit are used in combination to control the ringing and overshoot of the write head circuit.

An advantage of the present invention is the head drive current transition time, tr and tf, can be reduced without increasing the transient ring at the head due to a low amount of capacitance added at the circuit nodes Hx and Hy.

Another advantage of the present invention is simplicity of the additional circuit to improve the current transition time while simultaneously reducing transient ring. In addition, the simple circuit according to the present invention decreases the die area needed over prior art circuits.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 4 Shows a ring clamp/damp circuit for a write driver according to an embodiment of the present invention;

FIG. 5 Shows a damp circuit for a write driver according to another embodiment of the present invention;

FIG. 6 Represents a HDD system level view of an embodiment of the present invention.

DETAILED DESCRIPTION OF THE PREFERRED EMBODIMENTS

Figure 1:
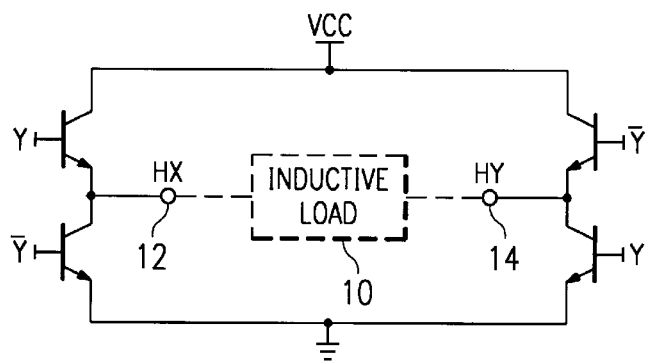
FIG. 1 Represents an H-bridge driver circuit according to the prior art.
Figure 2:
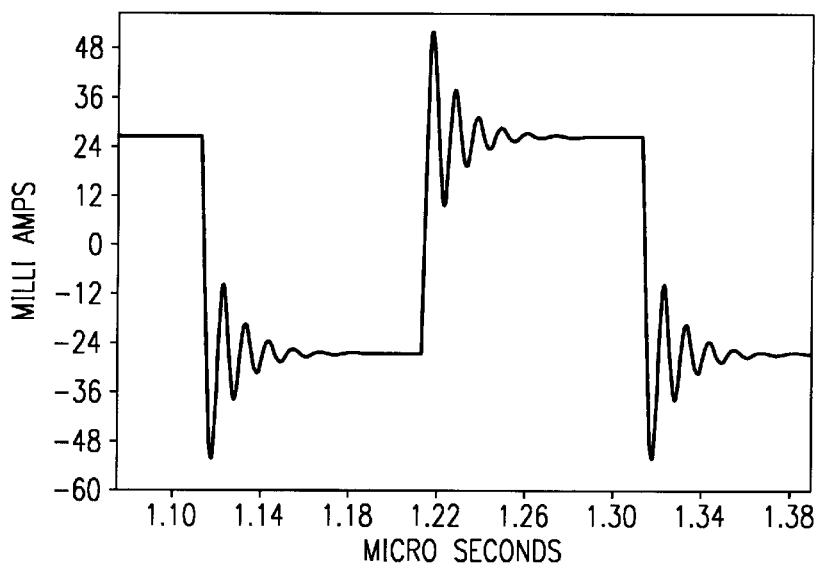
FIG. 2 Shows the response to a test pulse applied to the H-bridge driver circuit of FIG. 1 according to the prior art.

As discussed above, the electronic circuitry used to drive current through a HDD write head typically uses an H-bridge as shown in the prior art circuit of FIG. 1. This figure represents a simplified circuit of the write driver, sometimes referred to as the "writer" circuit. Typically the write driver circuit includes additional circuitry for driving the Y and $\overline{Y}$ inputs, with the top two or bottom two transistors setting the current value. See for example, U.S. Pat. No. 5,638,012 referenced above. The purpose of the H-bridge is to allow electric current to be driven through the write head in either direction. When the current is driven in one direction a magnetic field is created with the north pole in one direction, and when the current is driven in the opposite direction, a magnetic field is created with the north pole in the opposite direction. The magnetic field is then used to "write" data to the disk platter by magnetizing a small region on the disk platter.

The H-bridge operates to switch the drive current through the head by turning on a pair of transistors to allow current to flow in a path from a supply source to ground. For example, current flows through the write head from Hx to Hy when transistors Y are turned on and transistors Y are turned off. Similarly, current flows in the opposite direction when transistors Y are turned on and transistors Y are turned off. The DC operating point of the write head is the voltage at either side of the head when no current is flowing through the head.

Since the HDD write head is an inductive load, there are voltage and current swings (a characteristic transient ring) at the Hx and Hy outputs when the current through the head is reversed rapidly. It is desirable to increase the write frequency of the write head current transition without increasing the ringing period at these write outputs of the writer circuit.

Figure 3:
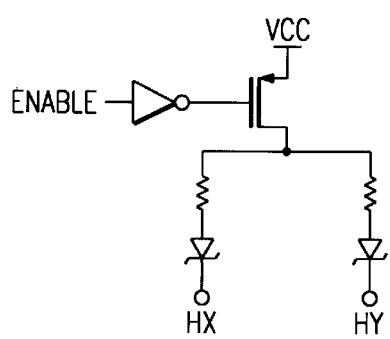
FIG. 3 Represents a prior art circuit for reducing current ringing.

A prior art circuit for reducing the transient ringing is shown in FIG. 3. This circuit was combined with the circuit shown in FIG. 1. The Hx and Hy nodes are connected to the write head in FIG. 1. In this circuit, transient rings at the Hx and Hy nodes are charged to VCC through Zenner diodes. This circuit was somewhat successful in reducing the transients described above, but at the same time increased the capacitance of the nodes thereby slowing the current transition time.

In operation, the damp circuit reduces the transient ring and overshoot by charging current into the Hx 10 and Hy 12 nodes when these nodes have a negative voltage due to the transient fluctuations at these nodes when the current is reversed rapidly. Thus, the present invention dampens the current ringing in at the write head by adding the circuit shown in FIG. 4 to the prior art circuit of FIG. 1 at the Hx and Hy terminals. The circuit shown in FIG. 4 is therefore a novel circuit and provides the advantages discussed when combined with the prior art circuit of FIG. 1.

In the embodiment of the present invention according to FIG. 4, the ring clamp circuit includes a resistor 20 connected to each node 12,14 of the write head. In a preferred embodiment, each resistor is then connected to the emitter of a npn transistor 22 where the transistors have a commonly enabled gate or Vbias and a common collector connected to a source voltage. In another embodiment, the transistors 22 may be enabled with a signal that also drives Y and Y or some signal related to the direction of the current direction being driven through the write head. In this embodiment, the enable is a bias voltage that is preferably chosen to be about one diode drop above the dc operating voltage of the write head or more, such that the circuit will supply current to the write head nodes with a quick turn on but with some resistance to limit the current compared to the embodiment discussed below.

In another embodiment of the present invention, the resistors 20 in FIG. 4 may be a small value or may not be necessary depending on the voltage levels at the write head and the transistors used. With smaller resistors, this embodiment may is targeted to minimize the large initial overshoot of the switching transient. This can be done by using a lower Vbias for the enable in FIG. 4 in combination with smaller resistors compared to the previously described embodiment. Here the Vbias may be less than the DC operating point plus one diode drop. This combination gives a larger shot of current into the Hx/Hy nodes for a short time due the lower bias voltage.

FIG. 5 represents yet another embodiment of the present invention. In this embodiment, the Vbias is supplied by an operational amplifier 24 connected to the gate of one transistor to allow adjustment of the ring clamp voltage which in turn controls the transitional current. The Vbias of the second transistor is connected back to the negative input of the operational amplifier to provide feedback to the operational amplifier. The positive input of the operational amplifier is connected to a voltage source 28 which may be adjustable. In a preferred embodiment, the voltage source is provided on the integrated circuit through a digital to analog converter such that the voltage source can be set through a serial port to the integrated circuit. In addition, a resistor 26 may be placed on each transistor emitter to dampen the transient ring during each current reversal. The resistors, if used, may also be adjustable. The adjustable damp voltage allows the ring current in the write head to be controlled from overshooting current to undershooting current.

In a preferred embodiment, the damp circuit of FIG. 4 is used to target ringing, thus acting as a ring clamp circuit, in combination with a circuit of FIG. 5 configured to target overshoot. Both of these circuits are used in parallel with the prior art circuits discussed in the background and shown in FIG. 1.

FIG. 6 represents a HDD system level view of the present invention. The hard disk drive 100 is connected to a computer 102 through a controller 104. The hard disk drive 100 has disk platters 106 which are driven by motor 108 to rotate as shown. Read and write heads 110 move upon an actuator mechanism 112 driven by a voice coil motor 114. Data detected by the heads is passed through the preamp 116 and then a read channel 118 and also used to provide feedback to the head actuator position system 120. Data signals from the HDD are fed to the controller 102 which is then passed to the computer 104. The present invention concerns improvements to the drive circuitry to write heads 110 as discussed above.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments. For example, while npn transistors are shown as a preferred embodiment, other transistor types such as nmos transistors are also contemplated by the current invention.

What is claimed is:

1. A hard disk drive for a computer system comprising:
   a. one or more platters having magnetic media on one or more surfaces;
   b. a write head associated with at least one of said surfaces having magnetic media;
   c. an H-bridge circuit capable of driving a current through said write head;
   d. a damp circuit connected to said write head comprising two transistors, where the base/gate of each transistor is connected to an enable, the emitters/sources are each connected to one side of said write head without a diode in the connection, and the collectors/drains are connected to a voltage source, and wherein said damp circuit has a Vbias voltage above a DC operating voltage of said write head to bias said transistors, and e. a second damp circuit connected to said write head comprising two transistors, where the base/gate of each transistor is connected to an enable having a Vbias, the emitters/sources are each connected to one side of said write head, and the collectors/drains are connected to a voltage source, wherein said second damp circuit enable bias voltage is below said DC operating voltage plus a diode drop.

2. The hard disk drive of claim 1 wherein said transistors of said damp circuit are npn transistors with common bases.

3. The hard disk drive of claim 2 wherein said damp circuit further comprises resistors between each of said transistor emitters/sources and said one side of said write head.

4. The hard disk drive of claim 2 wherein said enable is driven by an operational amplifier having a variably controllable input.

5. The hard disk drive of claim 1 wherein said second damp circuit further comprises at least one resistor between each of said transistor sources and said one side of said write head.

6. An integrated circuit for driving a write head of a hard disk drive comprising:
   a. an H-bridge circuit capable of driving a current through said write head; and
   b. a ring clamp circuit connected to said write head comprising two transistors, where the bases/gates of each transistor are connected to an enable and the emitters/sources are directly connected to one side of said write head, and with collectors/drains connected to a voltage source.

7. The integrated circuit of claim 6 wherein said transistors of said ring clamp circuit are npn transistors with common bases connected to a common enable.

8. The integrated circuit of claim 6 wherein said enable is driven by an operational amplifier having a variably controllable input.

9. The integrated circuit of claim 6 wherein said damp circuit has a Vbias voltage above a DC operating voltage of said write head plus a diode drop to bias said transistors and further comprising:
   a second damp circuit connected to said write head comprising two transistors, where the base/gate of each transistor is connected to an enable having a Vbias, the emitters/sources are each directly connected to one side of said write head, and the collectors/drain connected to a voltage source, wherein said second damp circuit enable bias voltage is below said DC operating voltage plus a diode drop.

10. An integrated circuit for driving a write head of a hard disk drive comprising:
    a. an H-bridge circuit capable of driving a current through said write head; and
    b. a ring clamp circuit connected to said write head comprising two resistors and two transistors, where a first terminal of each resistor is directly connected to one side of said write head, and with the opposite terminal of each resistor connected to a voltage source through one of said transistors.

11. The integrated circuit of claim 10 wherein said transistors of said ring clamp circuit are npn transistors with common bases connected to a common enable/Vbias.

12. The integrated circuit of claim 11 wherein said enable is driven by an operational amplifier having a variably controllable input.

13. The integrated circuit of claim 12 wherein said operational amplifier is driven by a variable voltage source where the voltage is controlled by a digital to analog converter on the integrated circuit.

14. The integrated circuit of claim 11 wherein said enable is driven by an operational amplifier.

15. The integrated circuit of claim 10 wherein said transistors of said ring clamp circuit are npn transistors with uncommon bases.

16. The integrated circuit of claim 10 wherein said transistors of said ring clamp circuit are nmos transistors with common gates connected to a common enable.

17. The integrated circuit of claim 10 wherein said damp circuit has a Vbias voltage above a DC operating voltage of said write head plus a diode drop to bias said transistors and further comprising:
    a second damp circuit connected to said write head comprising two transistors, where the base/gate of each transistor is connected to an enable having a Vbias, the emitters/sources are each directly connected to one side of said write head, and the collectors/drain connected to a voltage source, wherein said second damp circuit enable bias voltage is below said DC operating voltage plus a diode drop.

18. An integrated circuit for driving a write head of a hard disk drive comprising:
    a. an H-bridge circuit capable of driving a current through said write head; and
    b. a ring clamp circuit connected to said write head comprising two transistors and two resistors, where the bases/gates of each transistor are connected to an enable and the emitters/sources are directly connected to a first terminal of a resistor and the second terminals of each resistor are directly connected to one side of said write head, and the collectors/drains of each transistor are connected to a voltage source.

19. The integrated circuit of claim 18 wherein said transistors of said ring clamp circuit are npn transistors with common bases connected to a common enable.

20. The integrated circuit of claim 18 wherein said enable is driven by an operational amplifier having a variably controllable input.

21. The integrated circuit of claim 18 wherein said damp circuit has a Vbias voltage above a DC operating voltage of said write head plus a diode drop to bias said transistors and further comprising:
    a second damp circuit connected to said write head comprising two transistors, where the base/gate of each transistor is connected to an enable having a Vbias, the emitters/sources are each directly connected to one side of said write head, and the collectors/drain connected to a voltage source, wherein said second damp circuit enable bias voltage is below said DC operating voltage plus a diode drop.

* * * * *